(12) United States Patent
Carlson (10) Patent No.: US 6,666,167 B1
(45) Date of Patent: Dec. 23, 2003

(54) DRY PARTICULATE FOOD DISPENSER

(76) Inventor: Gerard Joseph Carlson, 4503 S. Riva Ridge Way, Boise, ID (US) 83709

( * ) Notice: Subject to any disclaimer, the term of this patent is extended or adjusted under 35 U.S.C. 154(b) by 0 days.

(21) Appl. No.: 10/328,879

(22) Filed: Dec. 24, 2002

(51) Int. Cl.[7] .................. A01K 5/00; A01K 15/02
(52) U.S. Cl. ........................................ 119/54; 119/706
(58) Field of Search ................ 119/52.1, 53.5, 119/54, 706

(56) References Cited

U.S. PATENT DOCUMENTS

| 1,309,090 | A | | 7/1919 | Hensen .................. 119/51.01 |
|---|---|---|---|---|
| 1,366,052 | A | * | 1/1921 | Bettenga .................. 119/54 |
| 3,604,397 | A | | 9/1971 | Salerno .................. 119/706 |
| 4,770,125 | A | * | 9/1988 | Gold et al. .................. 119/53.5 |
| 4,799,455 | A | | 1/1989 | Iams et al. .................. 119/54 |
| 5,113,795 | A | | 5/1992 | Delzio .................. 119/51.01 |
| 5,138,979 | A | | 8/1992 | Baird .................. 119/51.04 |
| 5,245,949 | A | * | 9/1993 | Hively .................. 119/53 |
| RE35,173 | E | | 3/1996 | Delzio .................. 119/51.01 |
| 5,735,231 | A | | 4/1998 | Terenzi .................. 119/51.11 |
| 5,794,560 | A | | 8/1998 | Terenzi .................. 119/51.11 |
| 6,053,124 | A | | 4/2000 | Kolbe .................. 119/51.01 |
| 6,345,593 | B1 | * | 2/2002 | Stewart et al. .................. 119/706 |
| 6,564,746 | B2 | * | 5/2003 | Burnham .................. 119/53.5 |

* cited by examiner

Primary Examiner—Charles T. Jordan
Assistant Examiner—Elizabeth Shaw
(74) Attorney, Agent, or Firm—G. J. Carlson (57) ABSTRACT

A dry particulate food dispenser provides food to pets in response to a scratching action upon a scratching surface. The scratching action operates an adjustable valve located inside a food hopper and limits the amount of food dropped into a supporting bowl. The adjustable valve allows the user to control the amount of food provided in each actuation of the valve and accommodates different shapes and sizes of dry food.

19 Claims, 10 Drawing Sheets

DRY PARTICULATE FOOD DISPENSER

BACKGROUND

1. Field of Invention

This invention relates to dry particulate matter dispensers, specifically to feeders activated by the scratching action of cats.

2. Description of the Prior Art

Numerous patents exist which describe cat scratching posts or animal feeders. Scratching posts typically consist of a frame covered with carpet, burlap or coiled rope to provide a surface that cats like to scratch. The support, and assembly of such frames are the focus of many patents.

For example, U.S. Pat. No. 3,604,397 to Salerno 1971 discloses a cat perch and exercise pole that wedges itself between the floor and ceiling of a residence by leg projections on the top and bottom. These leg projections, under spring pressure press outward along the axis of the exercise pole securing the pole between the ceiling and floor. Salerno however, does not disclose, teach nor claim any element that provides food to the cat.

Numerous other patents exist with the aim to automatically feed animals. Many of these patents come from the field of animal husbandry where farmers are attempting to wean or fatten animals. Other patents aim to automatically feed pets without the aid of a human or the activation by an animal. Such devices are characterized by electrical solenoids or motors which are activated by one or more timers or light sensors. They have several disadvantages such as requiring batteries or a source of alternating current. Their components such as timers, motors, solenoids and sensors are costly. Additionally, the numerous parts of such inventions reduces overall reliability. Further, the size and complexity of these devices make them difficult to clean and move. Safety can also be a concern where water is in close proximity with line voltages. Since these devices are automatic, food may be dispensed when the intended recipient animal is not around, thus leaving the food available to wild animals or other pets. In the case of cats, automatic feeders to not provide a scratching surface or reward a cat with food for using a designated scratching surface instead of home furnishings.

For example, U.S. Pat. No. 5,735,231 to Terenzi 1998 discloses an automatic dog and cat feeder. A timer operates a solenoid to retract a slide valve to dispense food by gravity from a hopper. The length of time that the timer activates the solenoid determines the amount of food delivered. U.S. Pat. No. 5,794,560 also to Terenzi 1998 discloses another automatic dog and cat feeder. A timer operates a solenoid to retract a single cone valve to dispense food by gravity from a hopper. The length of time that the timer activates the solenoid determines the amount of food delivered. Again, relying upon timers, Terenzi does not suggest, disclose, teach or claim any combination of elements which enable actuation by a cat.

Similarly U.S. Pat. No. 5,138,979 to Baird et al 1992 uses an electric solenoid to activate a sliding metering head. The metering head however in Baird's own words is limited to a particle size of up to 4 mm. To accommodate various sizes of fish food he teaches the substitution of different sizes of metering heads. For larger material Baird replaces the metering head with a single valve mechanism. Baird states that the valve opens "for the free flow material from the container. In this case, the control over the quantity dispensed is achieved by timing the opening of the device." Thus while Baird recognizes the problems associated with a single valve, he does not suggest, disclose, teach or claim any way to solve unlimited delivery except by timing the operation of the electric solenoid. Further Baird does not even suggest actuation by a cat.

There exist a number of animal actuated feeders.

U.S. Pat. No. 1,309,090 to Hensen discloses a feeding device. Hensen uses a cylindrical valve to open and close an opening in the bottom of the feed hopper. The valve is opened by the instinctive rooting action of a pig. Hensen does not disclose or suggest a means to limit the amount of feed delivered when the valve is open. Once the valve is opened by the pig, the feed contents of the hopper are free to flow without limit. Hensen himself admits that his device is "adapted for use in connection with hogs and kindred stock". Because the feeding device is actuated by the upward rooting action of hogs and kindred stock, it is not possible to operate the device by the instinctive scratching action of cats. While hogs and kindred stock, root in a down to upward motion, cats instinctively scratch in an up to downward motion. It is obvious that Hensen did not anticipate adaptation of his device for use by cats.

Hensen does not suggest, disclose, teach or claim any combination of elements which enable actuation by a cat.

U.S. Pat. No. 4,799,455 1989 discloses a farrowing crate creep feeder. The inventor uses a conical valve to open and close an opening in the bottom of the feed hopper. The valve is opened by the instinctive rooting action of a pig. This patent does not disclose or suggest a means to limit the amount of feed delivered when the valve is open. Once the valve is opened by the pig, the feed contents of the hopper are free to flow without limit. Because the creep feeder is actuated by the upward rooting action of piglets, it is not possible to operate the device by the instinctive scratching action of cats. While piglets, root from a down to upward motion, cats instinctively scratch in a downward motion. It is obvious that this invention did not anticipate adaptation for use by cats. The disclosure does not suggest, disclose, teach or claim any combination of elements which enable actuation by a cat.

U.S. Pat. No. 6,053,124 to Kolbe 2000 discloses an apparatus for feeding granulated feed supplements to livestock. Kolbe uses the licking action of bovines or similar animals to dispense feed supplements such as salt. As an animal licks an actuating block, a stopper is raised from a lower to upper position allowing the supplement to fall through the actuating block. Kolbe provides no mechanism to limit the amount of supplement delivered. Although the invention shows a stop rod to limit the travel of the stopper, nothing prevents the supplement from flowing around the stopper. The invention of Kolbe is suited to the licking motion of animals, but is not suitable to the scratching action of cats. Kolbe does not suggest, disclose, teach or claim any combination of elements which enable actuation by a cat.

U.S. Pat. No. 5,113,795 to Delzio 1992 and its reissue U.S. Pat. No. Re 35,173 in 1996 disclose a cat scratch post feeder. Delzio uses the instinctive scratching action of a cat to dispense feed into an unattached bowl. Delzio supports his device either from a wall or a free standing base, but does not provide for any means to keep the bowl under the feeder. Some of Delzio's embodiments require tools and installation to a wall or other household structure. Additionally, Delzio relies upon a spring loaded door or lid located at the bottom of a food hopper. However, the weight of the food rests directly upon the door or lid. This limits the amount of feed that the hopper can hold before the weight of the feed, overcomes the closure spring, dumping feed into the bowl or floor. Furthermore, the weight of the food in the hopper, changes the force that a cat must exert on the scratching surface before feed is dispensed. When the hopper is full, feed dispenses easily, when the hopper is near empty, feed dispenses only with great effort on the part of the cat. Still further, there is no means to limit the amount of feed dispensed once a cat pulls down upon the scratching surface. It is possible to empty the contents of the hopper if the cat were to set its claws in the scratching surface and stretch as cats are known to do. Nor does Delzio provide any mechanism to adjust the feeder to accommodate different sizes or amounts of cat food.

OBJECTS AND ADVANTAGES

Accordingly, several objects and advantages of the invention are:

(a) to provide a pet activated feeder that does not rely upon batteries or external electrical power;

(b) to provide a pet feeder that limits the amount of feed per activation cycle and does not dump its contents uncontrollably;

(c) to provide an adjustable feeder that can be adjusted to suit the various types of feed available;

(d) to provide a feeder that does not rely upon the independent placement of a feeding bowl to catch the distributed feed;

(e) to provide a feeder that is simple in its construction and inexpensive;

(f) to provide a feeder that is portable;

(g) to provide a feeder that is easy to clean;

(h) to provide a feeder that makes food available to cats but frustrates the attempts of other animals like dogs and birds;

(i) to provide a feeder that acts as a substitute scratching surface for cats thus reducing damage to household furnishings and decorations due to scratching;

(j) to provide a feeder that provides food on-demand in contrast to dispensing it at predetermined times whether or not a pet is present to eat it.

(k) to provide a feeder that does not require tools to assemble.

(l) to provide a feeder that does not require attachment to a wall or other structure.

Still further objects and advantages will become apparent from a consideration of the ensuing description and drawings.

BRIEF SUMMARY OF THE INVENTION

In accordance with the present invention, a bowl shaped base supports a feed hopper which is closed at its lower end by a valve mechanism. A scratching surface, placed over the feeder hopper, is supported by elastic bands attached to the hopper. As the scratching surface, actuated by a cat, moves up and down, it activates the valve mechanism. Upon activation, the valve mechanism dispenses a limited amount of feed from the hopper into the bowl shaped base.

LISTING OF REFERENCE NUMERALS

10 Food hopper,
12 Filling end,
13 Anchor points,
14 Dispensing end,
16 Linkage slots,
20 Scratching surface,
22 Lid,
32 Bowl,
34 Support structure,
36 Channel
40 Valve assembly,
42 Valve body,
44 Movable valve,
48 Valve body intake,
50 Upper valve,
51 Upper valve hole,
52 Lower valve,
53 Lower valve hole,
54 Valve stop,
55 Adjustable attachment,
56 Valve shaft,
57 Valve shaft upper end,
58 Knob,
59 Valve shaft lower end,
60 Valve plate,
62 Valve sleeve,
64 Valve cap,
65 Valve cap hole,
66 Suspension spring,
68 Valve plate orifice,
70 Compression spring,
72 Spring rest,
73 Spring rest hole,
74 Spring cap,
80 Valve linkage,
82 Suspension spring attachment,
84 Valve assembly contact point.
90 Attractive scent.

DETAILED DESCRIPTION

Description of Preferred Embodiment

Figure 1:
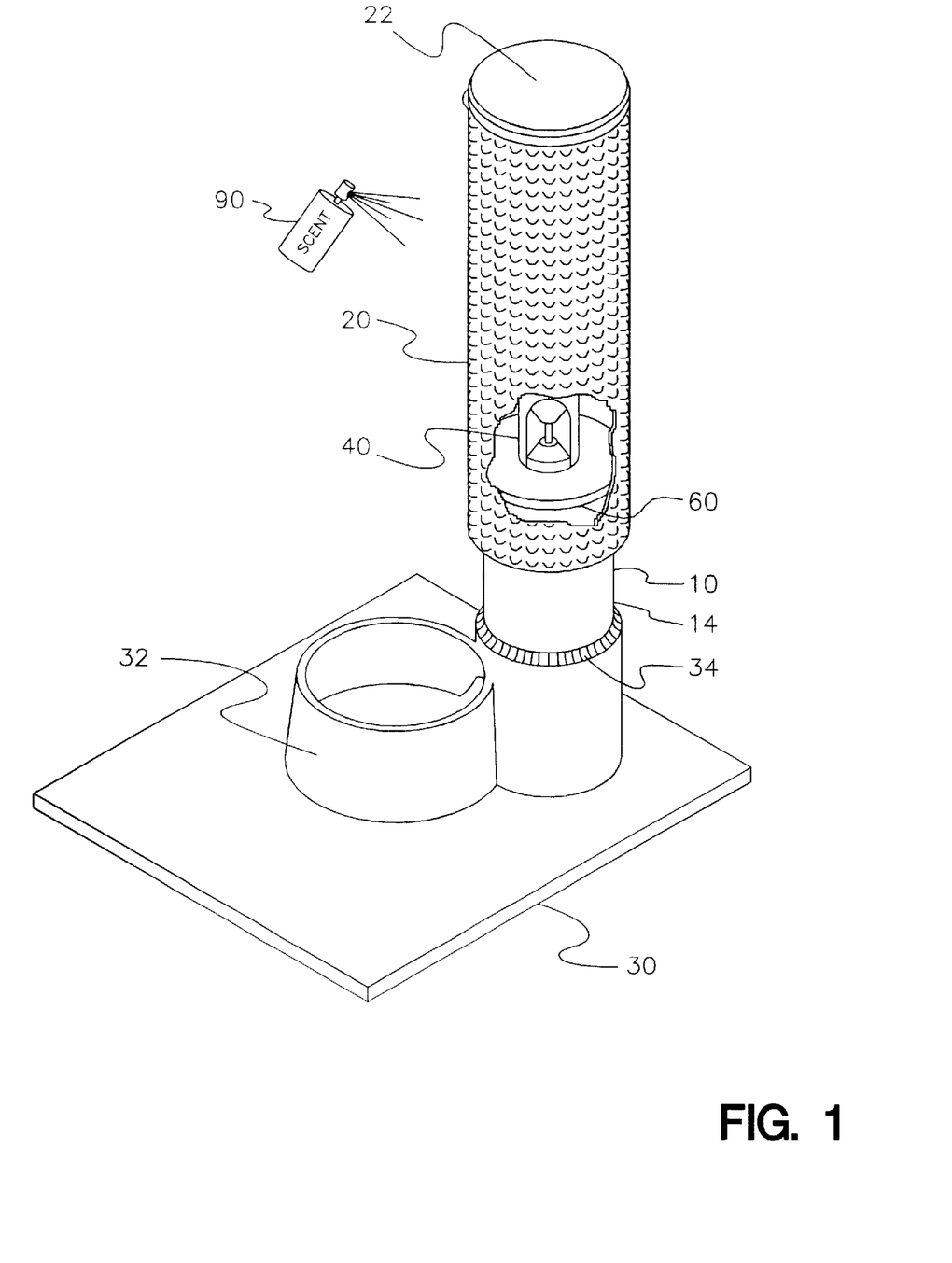
FIG. 1 is an external view of the dispenser with a cut-away view showing the valve assembly.

FIG. 1 shows an external view of the dispenser with a cut-away view showing an internal valve assembly 40. A base 30, with an integral bowl 32, has a support structure 34, to support a food hopper 10. Co-axially located around the food hopper 10, is a scratching surface 20. The scratching surface 20 is suspended from the food hopper 10, by elastic bands (not shown). Internal to the food hopper 10, Is a valve assembly 40, which prevents the dry particulate food in the upper part of the food hopper 10, from exiting the dispensing end 14 at the lower part of the food hopper 10.

Figure 2:
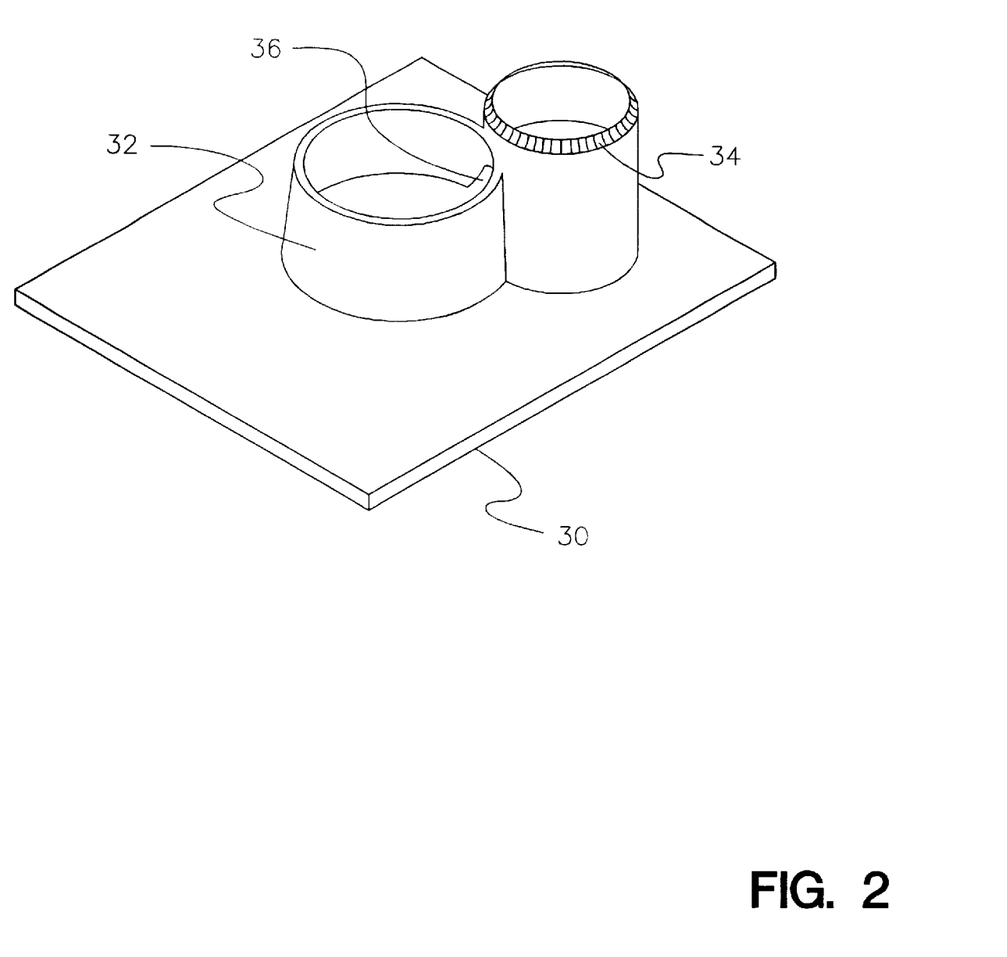
FIG. 2 is a view of the dispenser base.

FIG. 2 shows a more detailed view of the base 30. The base 30 includes a bowl 32, and a support structure 34. A channel 36 connects the support structure 34 to the bowl 32. In the preferred embodiment, the base 30, is made of any of a number of types of durable, rigid, plastic. Examples of suitable plastics include, but are not limited to poly vinyl chloride, poly propylene, and poly ethylene. The base is formed by any number of conventional plastic fabrication techniques including but not limited to injection molding, thermal forming, rotational molding and numerically controlled machining. All of these plastics and forming techniques are familiar to those skilled in the art of plastic fabrication and mass production. The size and shape of the base 30 are determined by the weight and height of the food hopper 10, scratching surface 20 and valve assembly 40 (FIG. 1). In use, the base 30, typically rests on a flat surface such as a floor and must be wide enough and heavy enough to prevent the dispenser from tipping when an animal such as a cat scratches its front paws against the scratching surface 20 (FIG. 1). The size and shape of the lower or dispensing end 14 of the food hopper 10, shown in FIGS. 1 and 4, determine the size and shape of the support structure 34. In the preferred embodiment, the support structure 34, receives the dispensing end 14 by a slip fit without the use of tools or fasteners. Other conventional joining techniques such as gluing, plastic welding, threading, screwing and integral manufacture are also possible.

Figure 3:
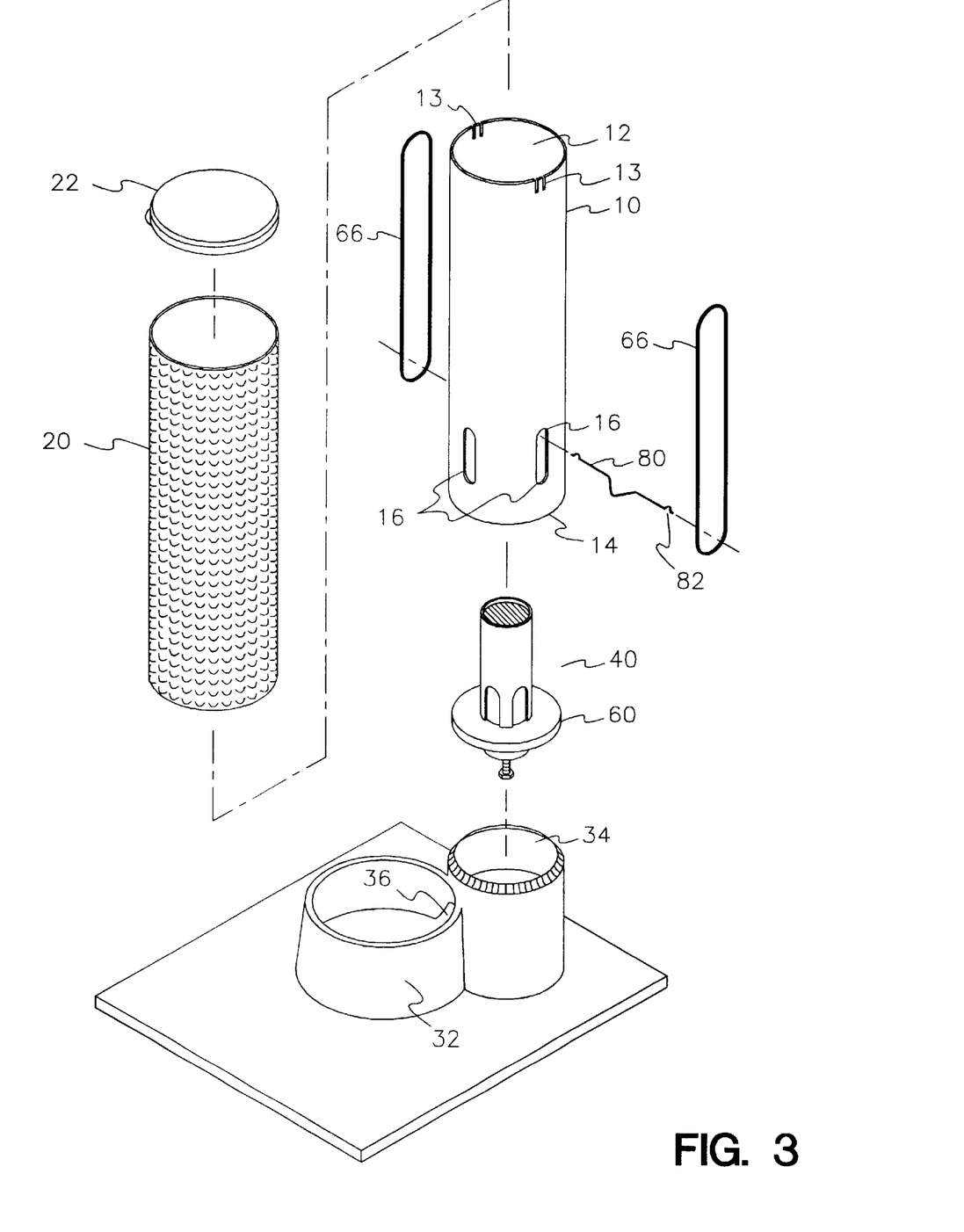
FIG. 3 is an exploded view of the dispenser.

FIG. 3 shows an exploded view of the dispenser. The food hopper 10 is a hollow cylinder approximately 40 cm in height and 10 cm in diameter although other heights and diameters are possible and the exact measurements are not critical to the operation of the dispenser. The materials and fabrication techniques of hopper 10 are similar to the base 30. The preferred embodiment uses 10 cm (4 inch) thin wall poly vinyl chloride drain pipe. As will be explained in the operation section of this disclosure, the upper end of the food hopper 10, is called the filling end 12 and the lower end is called the dispensing end 14. Two linkage slots 16, are located toward the dispensing end 14. The linkage slots 16 are approximately 5 cm in length and are wide enough to allow an easy sliding fit of the valve linkage 80 without binding. Two anchor points 13 near the filling end 12 fix one end of the suspension springs 66 to the food hopper 10. The valve assembly 40 slides into the food hopper 10 such that the valve plate 60 is above the linkage slots 16. The valve assembly 40 is fixed to the food hopper 10. The method of fixing the valve assembly 40 within the food hopper 10 can be by any number of conventional methods including gluing, screws, pins, or crimps. The preferred method is to decrease the inner diameter of the food hopper 10 just above the linkage slots 16, and to make the outer diameter of the valve plate 60, a little larger to create a sliding fit inside of the food hopper 10, until it wedges or rests on a section of decreased diameter. In this embodiment, the valve assembly 40 installs from the filling end 12.

The valve linkage 80, slides into the linkage slots 16, and under the valve assembly 40 and valve plate 60. Suspension springs 66 attach to the food hopper 10 at the two anchor points 13 and attach to the valve linkage 80 at the suspension spring attachment points 82 shown in detail in FIGS. 3, 9A and 9B. The suspension springs 66 are tension springs that urge the valve linkage 80 upward in the linkage slots 16 to contact part of the valve assembly 40. The suspension springs can be any suitable type of durable elastic material including, but not limited to rubber bands, surgical tubing, bungee-type cords, and metal springs. Instead of suspension springs, a counter-weight system is also possible.

The scratching surface 20 together with a lid 22 form a cylinder with the upper end closed. Materials suitable for the scratching surface 20 include but are not limited to, carpet, wood, plastic and fiber rope. The preferred material is nylon carpet conventionally butt welded to itself to form a cylinder with a plastic lid 22 closing the one end. The inner diameter of the scratching surface cylinder 20 is approximately 1 or 2 cm larger than the outer diameter of the food hopper 10 so as to have a loose sliding fit over the food hopper 10, the anchor points 13 and the suspension springs 66. The diameter of the scratching surface 20 must be smaller than the length of the valve linkage 80 such that the lower open end of the scratching surface 20 rests upon the valve linkage 80. The tension in the suspension springs 66 is such that the suspension springs 66 bias the valve linkage 80 at the upper portion of the linkage slots 16 and thereby support the weight of the scratching surface 20. When properly sized, the scratching surface 20 easily slides over the food hopper 10 and moves the valve linkage 80 from the upper to lower ends of the linkage slots 16.

Figure 4:
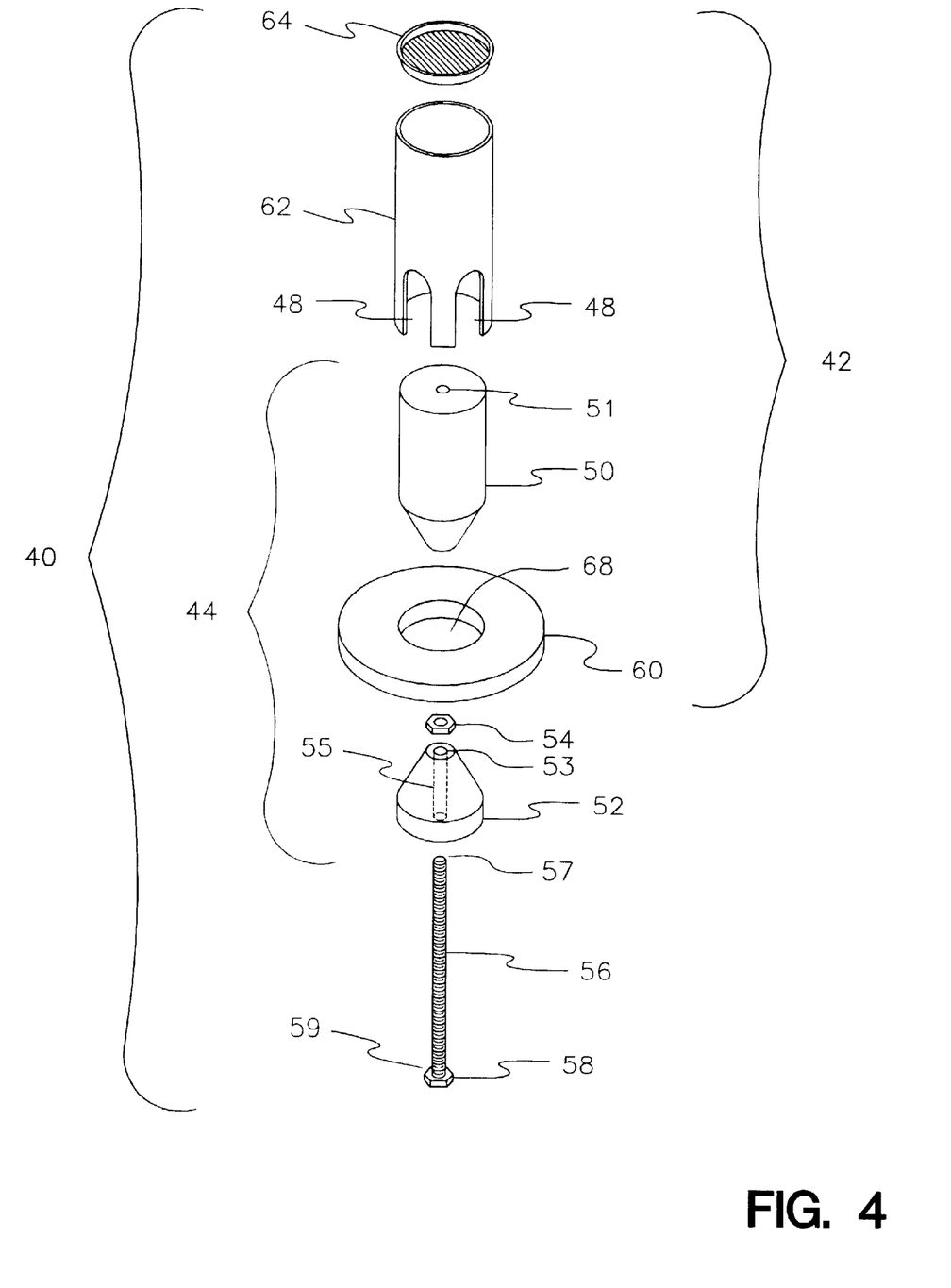
FIG. 4 is an exploded view of the valve assembly.

FIG. 4 shows an exploded view of the valve assembly 40. Two major subassemblies, the valve body 42 and the movable valve 44 make up the valve assembly 40. The valve plate 60, valve sleeve 62 and valve cap 64 together make up the valve body 42. The outer diameter of the valve plate 60 is such that the valve plate 60 is a sliding fit inside the food hopper 10. Thus the valve plate 60 prevents the passage of dry particulate food through the food hopper 10. The only way for food to get past the valve plate 60 is to pass through the valve plate orifice 68. The valve cap 64 closes the upper end of the valve body 42. One or more holes in the valve body serve as valve body intakes 48 and allow dry food to enter the valve body 42 and exit out the valve plate orifice 68.

Collectively, the upper valve 50, the lower valve 52, the valve stop 54, valve shaft 56, adjustable attachment 55 (FIGS. 5, 7 and 8) and knob 58 form the movable valve assembly 44. Two valves, an upper valve 50 and a lower valve 52 are located on opposite sides of the valve plate 60. A valve shaft 56 passes through the centers of both the upper valve 50 and the lower valve 52. In the preferred invention, the lower valve 52 is adjustably attached to the valve shaft 56. There are a number of ways to implement the adjustable attachment 55. The preferred method is to externally thread the valve shaft 56 and form matching internal threads on the lower valve 52. An adjustment knob 58 can then rotate to adjust the depth of the valve shaft 56 within the lower valve 52. Another adjustment method can be a sliding detent mechanism between the lower valve 52 and valve shaft 56. The valve shaft 56 passes through the valve plate 60 and into a hole in the upper valve 50. The upper valve hole 51 is such that the upper valve 50 easily slides along the valve shaft 56 without restriction. The relative size between the valve sleeve 62 and the upper valve 50 is such that the upper valve 50 slides within the valve sleeve 62. The upper valve 50 and lower valve 52 are cone shaped with a major diameter large enough to block the valve plate orifice 68 thus preventing the passage of dry food. The valve stop 54 attaches firmly to the valve shaft 56. As the valve shaft 56 is adjusted within the lower valve 52, the valve stop 54 moves with the valve shaft 56 and determines the minimum spacing between the upper valve 50 and the lower valve 52. In the preferred embodiment, all the parts of the valve assembly 40 are co-axial. In this co-axial arrangement, the upper valve 50 and lower valve 52 are co-located at their narrow portions to form an hour glass like shape. The valve stop 54, located between the narrow portions of the valves, determines the distance between the valve ends. Thus the neck of the hour glass like shape is adjustable by operation of knob 58.

Figure 5:
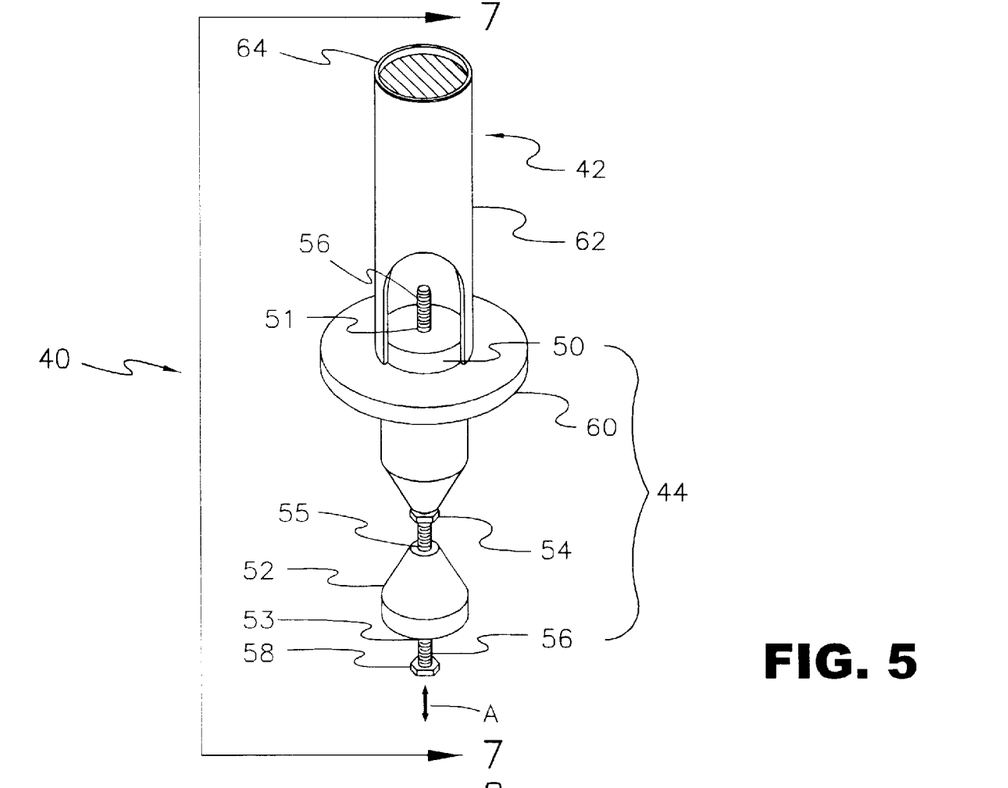
FIG. 5 is a view of the valve assembly with the valve in the lower position.
Figure 6:
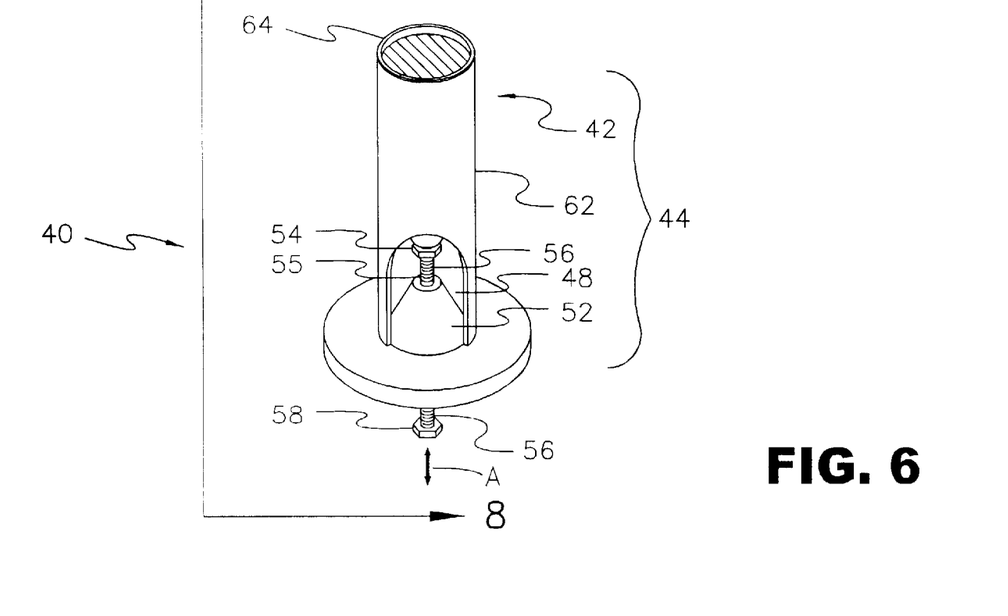
FIG. 6 is a view of the valve assembly with the valve in the upper position.

FIGS. 5 and 6 show the two positional limits of the movable valve 44 within the valve body 42. FIG. 5 shows movable valve 44 in a lower or second position while FIG. 6 shows the movable valve 44 in an upper or first position.

Figure 7:
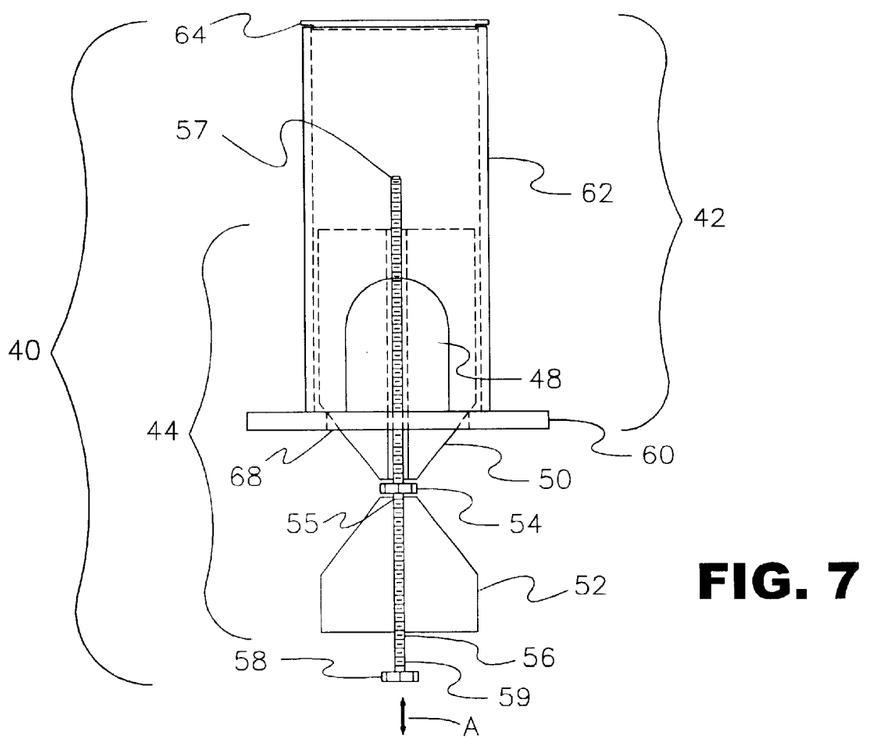
FIG. 7 is a sectional view of the valve assembly in FIG. 5.
Figure 8:
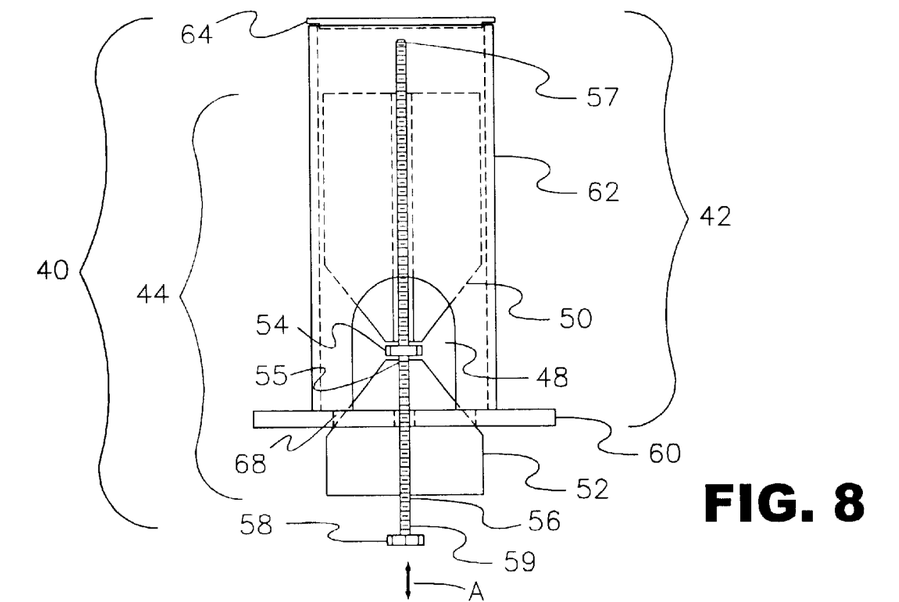
FIG. 8 is a sectional view of the valve assembly in FIG. 6.

FIGS. 7 and 8 are section views of FIGS. 5 and 6 respectively with the direction of the movable valve 44 indicated by the arrows A. FIGS. 5 and 7 show the upper valve 50 closing the valve plate orifice 68. As the valve shaft 56 moves downward, the valve stop 54 allows the upper valve 50 to progressively block the valve plate orifice 68 until the cone of upper valve 50 substantially blocks the valve plate orifice 68.

FIGS. 6 and 8 show the lower valve 52 closing the valve plate orifice 68. As the valve shaft 56 moves upward, the valve stop 54 pushes the upper valve 50 out of the valve plate orifice 68. As valve shaft 56 continues to move upward, the lower valve 52, which is attached to the valve shaft 56 progressively blocks the valve plate orifice 68 until the cone of lower valve 52 substantially blocks the valve plate orifice 68. When the movable valve 44 is in the upper or first position, dry food can enter the valve body 42 through the valve body intakes 48.

Figure 9A:
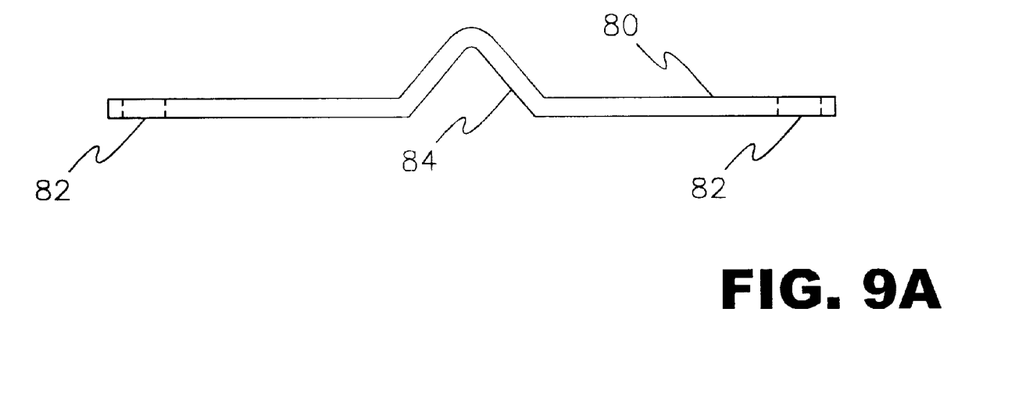
FIGS. 9A and 9B are of the valve linkage.
Figure 9B:
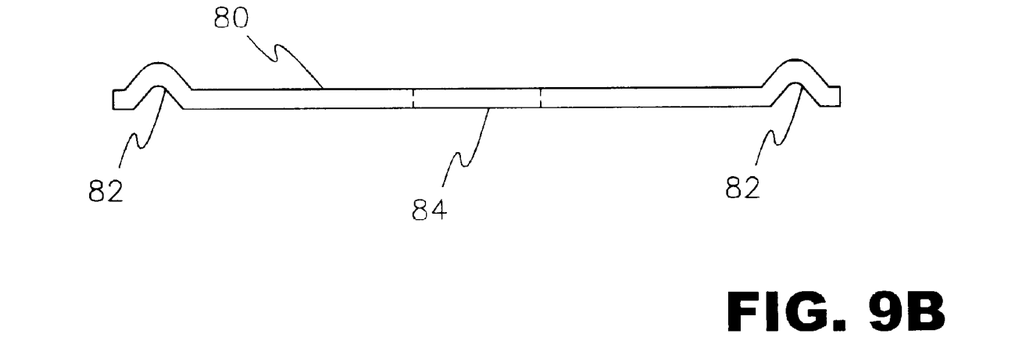

FIGS. 9A and 9B show details of the valve linkage 80. In the preferred embodiment, the valve linkage 80 is made of stiff wire such as 0.100 inch stainless steel, although other materials and thicknesses are possible. Valve linkage 80 has two suspension spring attachments 82 formed by a notch or bend at the ends of valve linkage 80. Suspension springs 66 (FIG. 3) attach to valve linkage 80 at suspension spring attachments 82. Valve assembly contact point 84, in the approximate center of valve linkage 80 contacts lower valve 52 (FIGS. 4–8 and FIG. 10). The bend at valve assembly contact point 84, allows for clearance of the valve shaft 56 and valve knob 58 (FIGS. 4–8 and FIG. 10).

Operation of the Preferred Embodiment

When an animal scratches the scratching surface 20, the additional downward force on the scratching surface 20 will push on the valve linkage 80 and overcome the force of the suspension springs 66. As the valve linkage 80 slides down in the linkage slots 16, the valve linkage 80 allows the movable valve 44 to fall along the direction of arrows A (FIGS. 5 and 7), under gravity to the lower or second position. Dry food located in between the upper valve 50 and lower valve 52 falls past lower valve 52, out of the dispensing end of food hopper 10, down the channel 36 and into the bowl 32. The upper valve 50 falls to close the valve plate orifice 68 preventing further dry food from exiting the food hopper 10. Because the upper valve 50 is not rigidly fixed to the valve shaft 56, the remainder of the movable valve assembly 44 can move downward completely even if dry food becomes trapped between the upper valve 50 and the valve plate 60. This sliding upper valve feature reduces jamming When the animal releases the scratching surface 20, the suspension springs 66 urge the valve linkage 80 and the scratching surface 20 upward along the directions of arrows A (FIGS. 6 and 8). As the valve linkage 80 travels upward within the linkage slots 16, the valve linkage 80 pushes against the lower valve 52 and moves the valve assembly 44 upward until the lower valve 52 blocks the valve plate orifice 68. This upper or second position prevents food from leaving the food hopper 10. The upper valve 50, lifted by the valve stop 54 moves upward and away from the valve plate orifice 68 and exposes the valve body intakes 48 to the food within the food hopper 10. The food enters the valve body 42 into the space between the upper valve 50 and the lower valve 52. The next scratching up and down cycle dispenses the food located in the valve body 42. The valve sleeve 62 and valve cap 64 support the weight of food in the food hopper 10 which might otherwise push down upon the upper valve 50. The adjustable attachment 55, (FIGS. 4–8), adjusted by the knob 58, moves the valve stop 54, relative to the lower valve 52. This adjustment controls the minimum distance between the upper valve 50 and the lower valve 52 and thus the amount of food that can fill the space between them.

Description of Alternative Embodiment

Figure 10:
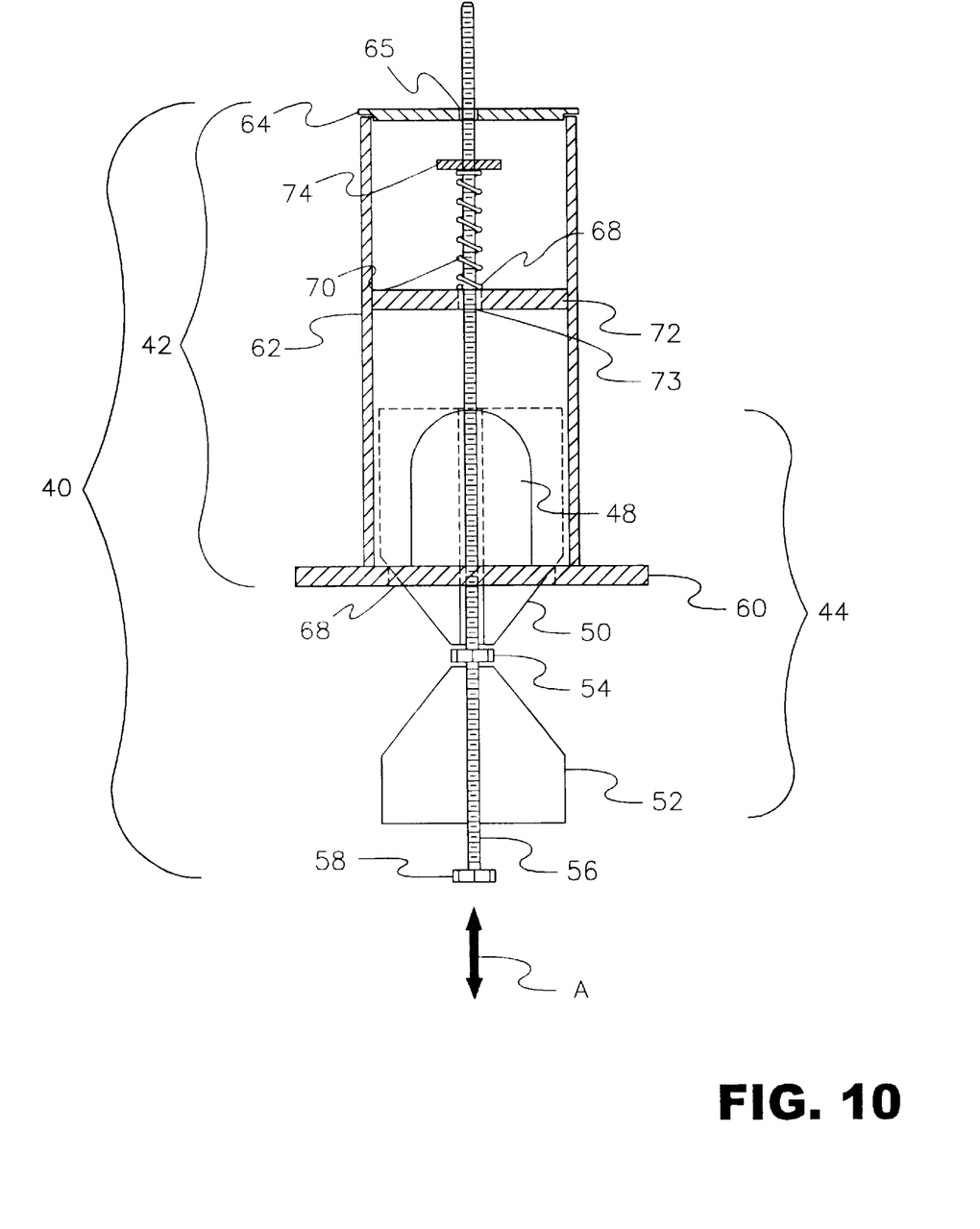
FIG. 10 is sectional view of an alternate embodiment of the valve assembly.

FIG. 10 shows valve assembly 40 in cross section. Valve shaft 56 extends through valve cap 64 via a valve cap hole 66. Refer now to FIG. 3. In this alternate embodiment, the valve shaft 56 extends past the filling end 12 of food hopper 10. The lid 22 of scratching surface 20 can now rest upon the extended valve shaft 56 (FIG. 10). Refer again to FIG. 10. The valve body 42 contains additional components; a compression spring 70, a spring rest 72 with a spring rest hole 73 and a spring cap 74. The spring rest 72 is rigidly fixed to the inside of the valve sleeve 62 and supports spring 70. The spring cap 74 attaches to valve shaft 56 either rigidly or adjustably by threads or other means. Spring cap 74 is positioned in either case to compress the compression spring 70 thus exerting an upward force on valve shaft 56. This upward force acts to urge movable valve 44 to the upper position.

Employing the embodiment of FIG. 10, compression spring 70 holds the movable valve 44 in the upper position. This eliminates the need for the suspension springs 66, linkage slots 16, valve linkage 80, or anchor points 13 of FIG. 3. Compression spring 70 is sized to provide sufficient upward force on the valve shaft 56 to position the movable valve 44 to the upper position and simultaneously support the weight of scratching surface 20. In this embodiment, the underside of lid 22 of scratching surface 20 rests on valve shaft 56 as valve shaft 56 extends past the filling end of 12 of food hopper 10.

Operation of Alternative Embodiment

Referring to FIG. 10, compression spring 70, supported by spring rest 72 acts against spring cap 74 and exerts an upward force on extended valve shaft 56. As valve shaft 56 moves upwards, it urges moveable valve 44 into an upper or first position analogous to the positions shown in FIGS. 6 and 8. Additionally, as valve shaft 56 passes through valve cap hole 65, it contacts and supports lid 22 and therefore attached scratching surface 20 (FIGS. 1 and 3). As an animal exerts a downward scratching force on scratching surface 20, the force is transmitted to lid 22, valve shaft 56 and movable valve 44. As valve shaft 56 moves downward under this force, it urges moveable valve 44 into an lower or second position analogous to the positions shown in FIGS. 5 and 7 thus opening the valve and dispensing food.

If spring cap 74 is adjustable along valve shaft 56, the compression force exerted by compression spring 70 can be varied. Such an adjustment feature can be employed to accommodate various weights of scratching surface 20 or to demand more effort from the scratching animal.

Additional Embodiments—Attractive Scent

As a training aid, an attractive scent 90 (FIG. 1), is applied to the scratching surface 20. The attractive scent 90, can be any one of commercially available scents applied as an aerosol, power, spray or herb. For cats, a commonly available cat nip spray is applied to the scratching surface 20 encouraging cats to investigate and scratch the scratching surface 20. Once acquainted with the food delivery feature of the invention, animals quickly learn to use it without the further enticement of the attractive scent 90.

Additional Embodiments—Valve Shapes

Figure 11A:
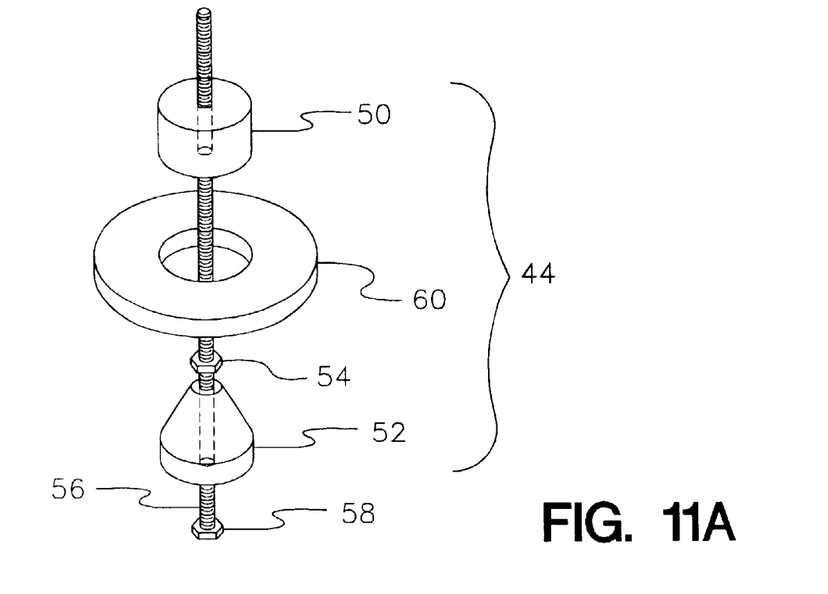
FIGS. 11A–11D are a views of an alternate valve assembly embodiments.
Figure 11B:
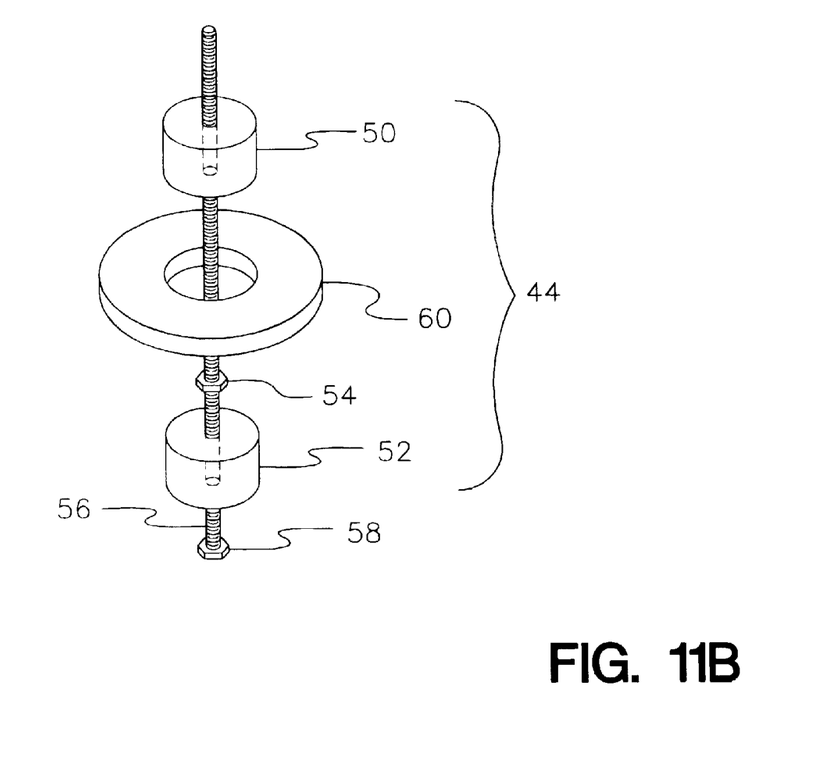

The preferred embodiment described upper valve 50 and lower valve 52 as conical in shape, but innumerable other shapes are possible. For example, FIG. 11A shows upper valve 50 with a cylindrical shape, while FIG. 11B shows lower valve 52 with a cylindrical shape.

Additional Embodiments—Lower Valve Only

Figure 11C:
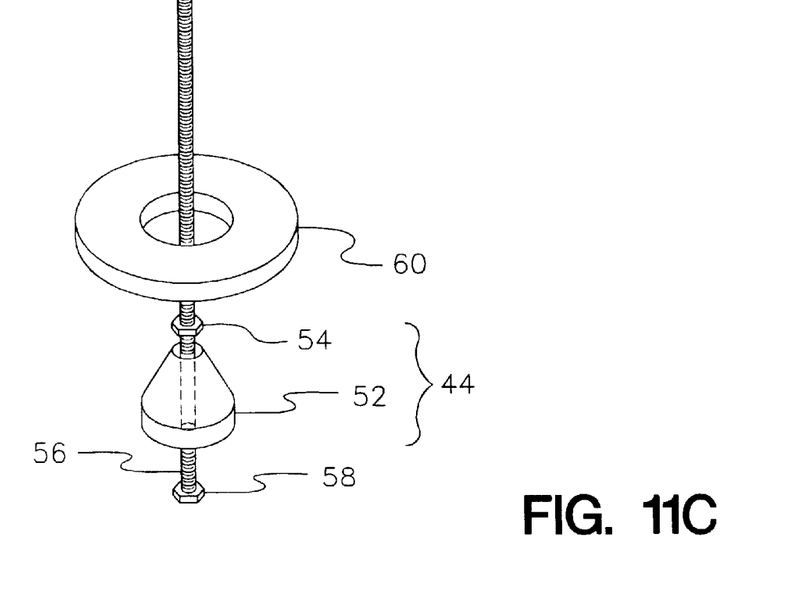
Figure 11D:
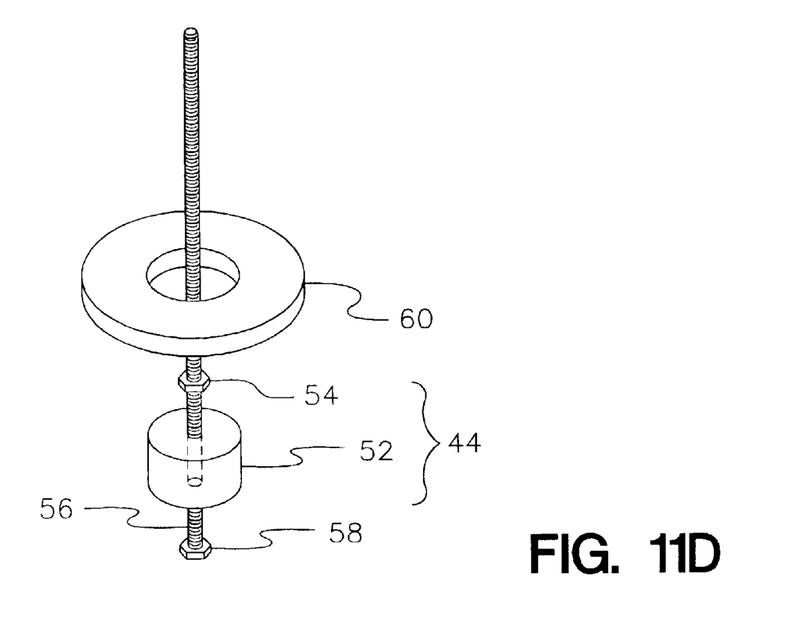

While the preferred embodiment employs and upper valve 50 and a lower valve 52, it is possible to use only a lower valve 52. FIGS. 11C and 11D show movable valve 44 with a lower valve 52 only without an upper valve 50.

Additional Embodiments—Non-Adjustable

The preferred embodiment described an adjustable attachment 55 controlled by a knob 58. It is possible to fix the lower valve 52 to the valve shaft 56 and thereby fix the distance between the upper valve 50 and lower valve 52. this embodiment eliminates the need for an adjustable attachment 55 and knob 58.

Additional Embodiments—Non-Slidable Upper Valve

The preferred embodiment described the upper valve 50 slideably located on the valve shaft 56. An alternative embodiment is to fix the upper valve to the valve shaft 56. This embodiment can be practiced with or without the adjustable attachment 54.

Conclusions, Ramifications and Scope

Thus the reader will see that the dry particulate food dispenser of the invention:

provides a pet activated feeder that does not rely upon electrical power;

provides a pet feeder that limits the amount of feed per activation cycle;

provides adjustment mechanism to suit the various types of feed available;

provides an integral feeding bowl;

does not rely upon the independent placement of a feeding bowl to catch feed;

provides a feeder that is simple in its construction and inexpensive;

provides a feeder that is portable;

provides a feeder that is easy to clean;

provides a feeder that makes food available to cats but frustrates the attempts of other animals like dogs and birds;

provides a feeder that acts as a substitute scratching surface for cats thus reducing damage to household furnishings and decorations due to scratching;

provides a feeder that provides food on-demand in contrast to dispensing it at predetermined times whether or not a pet is present to eat it;

provides a feeder that does not require tools to assemble;

provides a feeder that does not require attachment to a wall or other structure.

While the above description contains many specificities, these should not be construed as limitations on the scope of the invention, but rather as an exemplification of one preferred and alternate embodiments thereof Many other variations are possible including valve and bowl shapes, colors and textures. Various materials can be used in the construction, and interchangeable colored or decorated scratching surfaces might be changed with the season, holiday or decor.

Thus the scope of the invention should be determined by the appended claims and their legal equivalents, rather than by the examples given.

I claim:

1. A dry particulate food dispenser comprising:
    a food hopper 10 having a filling end 12 and a dispensing end 14;
    a valve assembly 40 located adjacent to the dispensing end 14 of the food hopper 10, the valve assembly 40 comprising: a valve body 42 having a valve plate 60, and a movable valve 44 having a first position and a second position, the first position closing the valve against the valve plate 60 to prevent food in the food hopper 10 from exiting the dispensing end 14, the second position opening the valve away from the valve plate 60 to allow food to exit from the dispensing end 14; and
    a scratching surface 20, moveable relative to the food hopper 10, the scratching surface 20 substantially engaging the movable valve 44 to displace the movable valve 44 from the first position to the second position.

2. A dispenser as in claim 1, wherein the moveable valve 44 is substantially cone shaped.

3. The dispenser of claim 1 further comprising an attractive scent 90 applied to the food dispenser to attract cats and encourage scratching.

4. The dispenser of claim 1 wherein the movable valve 44 is further comprised of a valve shaft 56, operatively attached to the movable valve 44, such that the valve shaft 56 extends from the filling end 12 of the food hopper 10, to substantially contact the scratching surface 20 whereby motion of the scratching surface 20 displaces the valve from the first position to the second position.

5. The dry food dispenser of claim 1 wherein the filling end 12 and dispensing end 14 of the food hopper 10 are one in the same.

6. The dry food dispenser of claim 1 wherein the food hopper 10 and scratching surface 20 are co-axial.

7. The dry food dispenser of claim 1 wherein the food hopper 10, scratching surface 20, and valve assembly 40 are co-axial.

8. A dry particulate food dispenser comprising:
    a food hopper 10 having a filling end 12 and a dispensing end 14;
    a valve assembly 40 located adjacent to the dispensing end 14, the valve assembly 40 comprising:
        a valve body 42, a valve plate 60 and a movable valve 44 having a first position and a second position, the first position allowing food from the food hopper 10 to enter the valve body 42, the second position allowing food to exit from the valve body 42 out of the dispensing end 14;

a scratching surface 20, moveable relative to the food hopper 10, the scratching surface 20 substantially engaging the movable valve 44 to displace the movable valve 44 from the first position to the second position; and a base 30, comprising:
- a bowl 32, and
- a support structure 34, for supporting the food hopper 10;

whereby, a scratching action upon the scratching surface 20, operates the moveable valve to dispense food from the food hopper 10, out of the dispensing end 14 of the food hopper 10, and into the bowl 32.

9. The dispenser of claim 8 further comprising an attractive scent 90 applied to the food dispenser to attract cats and encourage scratching.

10. The dispenser of claim 8 wherein the movable valve 44 is further comprised of an upper valve 50, and a lower valve 52, the upper valve 50 acting against the valve plate 60 to obstruct flow when the movable valve 44 is in the lower position and the lower valve 52 acting against the valve plate 60 to obstruct flow when the movable valve 44 is in the upper position; whereby food exits the dispensing end 14 when the movable valve 44 travels between the first and second positions.

11. The dispenser of claim 10 wherein at least one of the upper or lower valves is substantially cone shaped.

12. The dispenser of claim 10 wherein the movable valve 44 is further comprised of a substantially cone shaped upper valve 50, a substantially cone shaped lower valve 52, the upper valve 50 and lower valve 52 co-located at their narrow portions to form an hour glass like shape.

13. The dispenser of claim 10 wherein the movable valve 44 is further comprised of a valve shaft 56, with an upper end 57, and a lower end 59, a lower valve 52 having an adjustable attachment 55 to the lower end 59, an upper valve 50 slidingly located along the upper end 57, a valve stop 54 operatively connected between the upper end 57 and lower end 59 of the valve shaft 56 to limit the travel of the upper valve 50 along the valve shaft 56;

whereby the minimum distance between the upper valve 50 and lower valve 52 is determined by the adjustable attachment 55.

14. The dispenser of claim 13 wherein the valve shaft 56 extends from the filling end 12 of the food hopper 10, to contact the scratching surface 20 whereby motion of the scratching surface 20 displaces the valve from the first position to the second position.

15. A dry particulate food dispenser comprising:

a food hopper 10 having a filling end 12 and a dispensing end 14;

a valve assembly 40 located adjacent to the dispensing end 14 of the food hopper 10, the valve assembly 40 comprising: a valve body 42, and a movable valve 44 having a first position and a second position, the first position allowing food from the food hopper 10 to enter the valve body 42, the second position allowing food to exit from the valve body 42 out of the dispensing end 14;

a valve linkage 80 to actuate the movable valve 44 between the first position and the second position;

a scratching surface 20, moveable relative to the food hopper 10, the scratching surface 20 substantially engaging the valve linkage 80 to displace the movable valve 44 from the first position to the second position; and a base 30, comprising:
- a bowl 32; and
- a support structure 34, supporting the dispensing end 14 of the food hopper 10;

whereby, a scratching action upon the scratching surface 20, operates the valve linkage 80 which actuates the moveable valve 44 to dispense food from the food hopper 10, out of the dispensing end 14 into the bowl 32.

16. The dispenser of claim 15 wherein the movable valve 44 is further comprised of an upper valve 50, and a lower valve 52, the upper valve 50 acting against a valve plate 60 to obstruct flow when the movable valve 44 is in the lower position and the lower valve 52 acting against a valve plate 60 to obstruct flow when the movable valve 44 is in the upper position.

17. The dispenser of claim 16 wherein at least one of the upper or lower valves is substantially cone shaped.

18. The dispenser of claim 16 wherein the movable valve 44 is further comprised of a substantially cone shaped upper valve 50, a substantially cone shaped lower valve 52, the upper valve 50 and lower valve 52 co-located at their narrow portions to form an hour glass like shape.

19. The dispenser of claim 15 wherein the movable valve 44 is further comprised of a valve shaft 56, with an upper end 57 and a lower end 59, a lower valve 52 having an adjustable attachment 55 to the lower end 59, an upper valve 50 slidingly located along the upper end 57, a valve stop 54 attached between the upper end 57 and lower end 59 of the valve shaft 56 to limit the travel of the upper valve 50 along the valve shaft 56.

\* \* \* \* \*